United States Patent

Rævsager

[11] Patent Number: 5,881,640
[45] Date of Patent: Mar. 16, 1999

[54] APPARATUS FOR INJECTING BRINE INTO FOOD PRODUCTS

[75] Inventor: Erik Rævsager, Jystrup, Denmark

[73] Assignee: Wolfking Danmark A/S, Slagelse, Denmark

[21] Appl. No.: 873,366

[22] Filed: Jun. 12, 1997

[30] Foreign Application Priority Data

Jan. 17, 1997 [DK] Denmark ............................ DK006197

[51] Int. Cl.⁶ .............................. A22C 17/00; A23L 1/31
[52] U.S. Cl. .................... 99/533; 99/408; 99/487
[58] Field of Search ............................ 99/485–487, 494, 99/516, 532, 533, 535, 408; 426/281, 231, 652, 264

[56] References Cited

U.S. PATENT DOCUMENTS

| 3,590,721 | 7/1971 | Hoffmann . | |
|---|---|---|---|
| 3,675,567 | 7/1972 | Rejsa et al. | 99/533 |
| 3,922,357 | 11/1975 | Townsend . | |
| 4,142,000 | 2/1979 | Townsend | 426/281 |
| 4,286,510 | 9/1981 | Prosenbauer . | |
| 4,620,478 | 11/1986 | Corominas | 99/535 X |
| 4,622,892 | 11/1986 | Corominas . | |
| 4,903,590 | 2/1990 | Muller et al. | 99/487 |
| 4,924,771 | 5/1990 | Langen et al. | 99/533 |
| 5,042,370 | 8/1991 | Trijssenaar | 99/492 |
| 5,071,666 | 12/1991 | Handel et al. | 426/652 X |
| 5,142,971 | 9/1992 | Norrie | 99/487 |
| 5,272,964 | 12/1993 | Ostergaard | 99/533 |
| 5,638,744 | 6/1997 | Smith | 99/487 |
| 5,664,488 | 9/1997 | Smith | 99/487 |

FOREIGN PATENT DOCUMENTS

| 147991 | 1/1985 | Denmark . |
|---|---|---|
| 0 297 592 | 1/1989 | European Pat. Off. . |
| 0 391 454 | 10/1990 | European Pat. Off. . |
| 0 479 447 A1 | 4/1992 | European Pat. Off. . |
| 0 561 105 A1 | 9/1993 | European Pat. Off. . |
| 25 28 471 | 1/1977 | Germany . |
| 30 34 284 A1 | 4/1981 | Germany . |
| 31 17 899 A1 | 3/1982 | Germany . |
| 35 09 158 A1 | 9/1986 | Germany . |

Primary Examiner—Timothy F. Simone
Attorney, Agent, or Firm—Pennie & Edmonds LLP

[57] ABSTRACT

The apparatus comprises a control for intermittent operation of the reciprocating drive in such a manner, that the drive, taking the topmost position of the multi-needle injector as a point of departure, is started by receiving a synchronizing signal produced when the intermittent advancement of the production line stops in a correct position, after which the drive carries out a complete cycle of downward and upward movement of the multi-needle injector and stopping in said topmost position in readiness for a new synchronizing signal, the cycle time of the drive being shorter than the time of rest for the intermittent advancement of the production line, whereas the multi-needle injector is designed to cover a space in the direction of advancement of the production line corresponding to at least one advancement step for the intermittent advancement of the food product by the production line.

7 Claims, 3 Drawing Sheets

APPARATUS FOR INJECTING BRINE INTO FOOD PRODUCTS

FIELD OF THE INVENTION

The present invention relates to an apparatus for injecting brine into food products.

BACKGROUND OF THE INVENTION

This apparatus is generally used for treating pieces of food product by injecting a brine containing various salts, sugar, spices, oils, marinades, preservatives, binders and the like to be evenly distributed in the pieces of food product, partly to achieve a desirable taste and colour of the product, partly to achieve an evenly distributed weight increase.

In known apparatuses of the kind referred to initially, the advancement of the food product takes place stepwise and in synchronism with the downward and upward movement of the multi-needle injector, the advancing mechanism being mechanically connected to the drive for the reciprocating movement of the multineedle injector. If such a known apparatus is to be used in connection with a production line, in which the food products are advanced portion-wise and intermittently, it is necessary to provide a synchronization between the portion-wise intermittent advancement of the production line and the step-wise advancement by the apparatus of the food product within the multi-needle injector.

SUMMARY OF THE INVENTION

It is the object of the invention to provide an apparatus of the kind referred to initially, by which the synchronization mentioned above is substantially simplified, at the same time as the apparatus is simplified and made substantially more flexible with regard to dismantling and cleaning. According to the invention, this is achieved by means of an apparatus of the kind referred to initially, said apparatus being distinguished by the measures set forth herein. By controlling the drive of the multi-needle injector for intermittent operation with stop in the top position and with a cycle time being shorter than the rest period for the intermittent advancement of the production line, a situation is achieved, in which the multi-needle injector can carry out an injection cycle during the rest period of the production line and then merely await the next stopping of the production line, for then to carry out a new injection cycle. In order to ensure that all the food products in the production line are injected with brine, the multi-needle-injector must, of course, be designed in such a way, that it covers an area in the direction of advancement of the production line corresponding to at least one advancement step for the intermittent advancement of the food product by the production line.

Additional and advantageous developments, as set forth herein, make it possible to place the heavy parts of the apparatus at a relatively low level, so that the centre of gravity will be at a low level and the stability of the apparatus will be increased. With the features of the invention set forth herein, it is easy to separate the apparatus from the production line and provide an interlock position between the apparatus and the production line when joining the two, thus ensuring correct functioning of the apparatus and easy cleaning of the apparatus and the production line. The invention also provides a safe separation of the portions of food product in separate compartments; in this connection, the multi-needle injector must, of course, be designed in such a manner that the vanes do not interfere with the multineedle injector and its injection needles. In addition to the above, the present invention provides for a two-stage injection of the food product, where the food product in a first stage is injected by the part of the multi-needle injector situated upstream in the direction of the transportation of the food product, and then, in a subsequent injection cycle, injected by the part of the multi-needle injector situated downstream, the injection needles of the latter being offset relative to the injection needles in the upstream part of the multi-needle injector. The invention further provides for a collection and re-use of surplus brine, the surplus brine being filtered before being re-used.

BRIEF DESCRIPTION OF THE DRAWINGS

In the following, the invention is explained in more detail with reference to the drawing, in which.

DETAILED DESCRIPTION OF THE INVENTION

Figure 1:
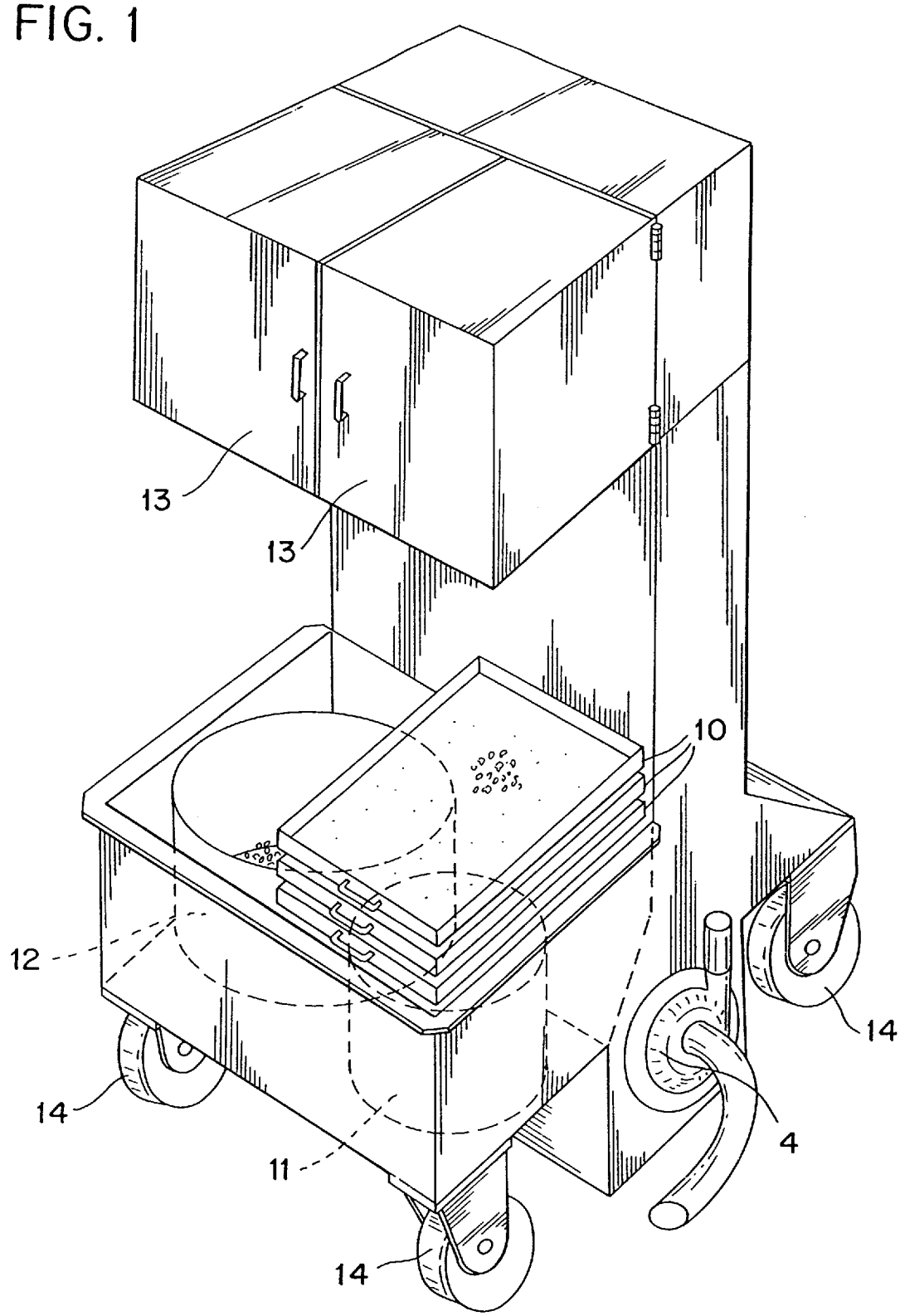
FIG. 1 is a sketch in perspective of an embodiment of an apparatus according to the invention, placed separately from the transport arrangement of the production line.

The embodiment shown in the drawing of the apparatus according to the invention for injecting brine into food products being advanced portion-wise and intermittently in a production line 6 comprises a multi-needle injector 1 with a number of injection needles 2, by means of a pump 4 being supplied with brine under pressure and delivering brine to the food product during the movement of the needles through a food product not shown in the drawing, placed on a conveyor belt 7 between vanes 8. A drive mechanism not shown in the drawing, alternatively comprising a crank mechanism, a pneumatic mechanism, a hydraulic mechanism or the like, is connected to the multi-needle injector 1 via a shaft assembly 5 in order to move the multi-needle injector 1 up and down. As is usual, the multi-needle injector 1 comprises a manifold chamber 3 for the distribution of the brine to the needles 2 and a stripper plate 15, possibly preloaded by a spring 16, to pull the food product off the needles 2 in connection with the upward movement of the needles.

In the embodiment shown, the portion-wise and intermittent advancement of the food product in the production line 6 is ensured by means of vanes 8, separating the individual portions of the food product between two such vanes 8, and the stepwise intermittent advancement of the food product takes place in steps corresponding to the distance between two such vanes 8. In the embodiment shown, the multi-needle injector is designed in such a manner, that an upstream part of the multi-needle injector fits in between two vanes 8 situated upstream, and a downstream part of the multi-needle injector fits in between the corresponding two vanes 8 situated downstream. Thus, one advancement step for the intermittent advancement of the food product on the production line 6 corresponds to the spacing between two adjacent vanes 8, and the multi-needle injector 1 is designed with a needle pattern in its upstream part that is offset relative to the needle pattern in its downstream part, so that the upstream part of the multi-needle injector 1 provides a coarse needle pattern in the food product, after which the downstream part of the multi-needle injector 1 adds the same pattern, but offset from the first pattern, thus providing a fine needle pattern. In this manner, only one-half of the number of needles will be inserted in the product at the same moment of time.

Figure 3:
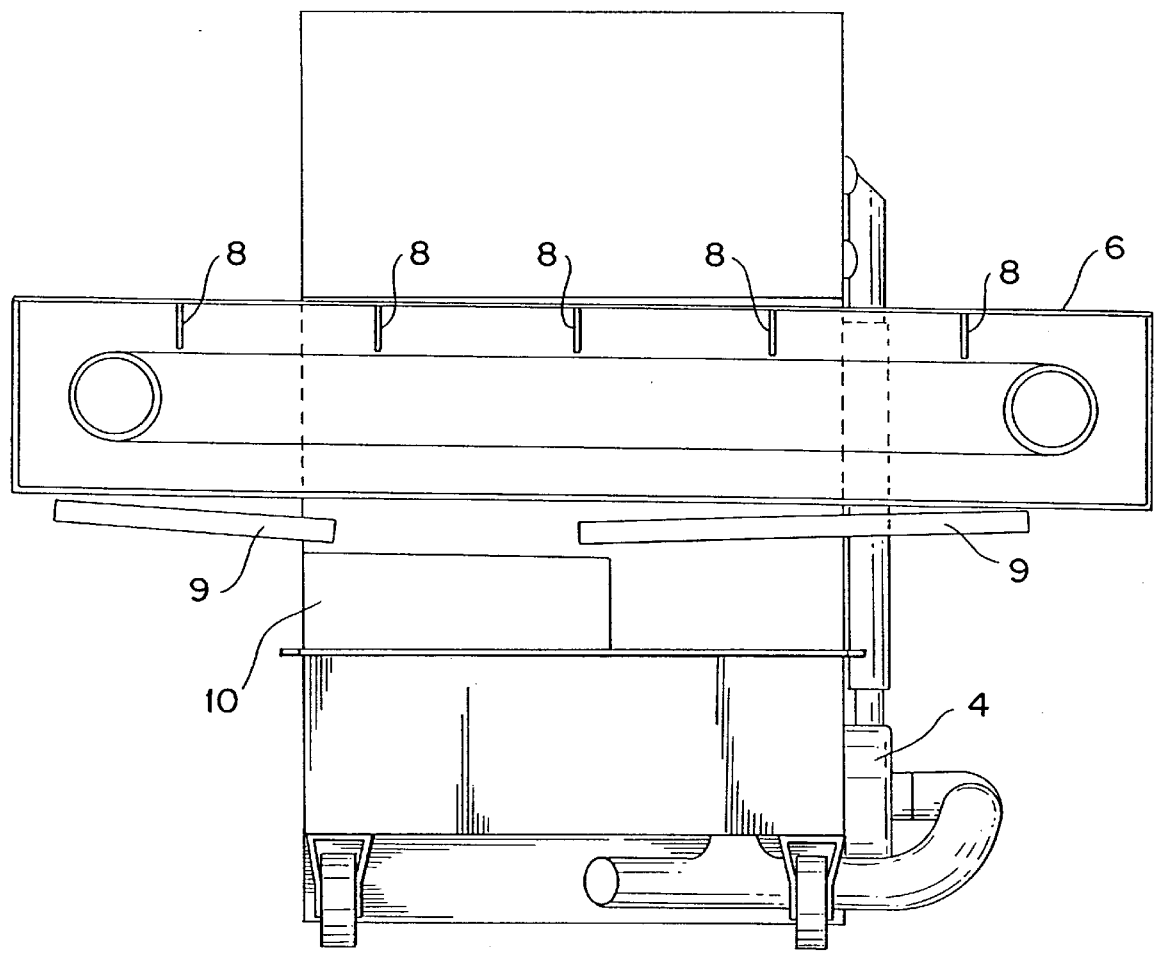
FIG. 3 is a front view of the apparatus according to FIG. 2.

As will be evident from FIG. 3, collecting trays 9 for collecting surplus brine dripping down from the transport arrangement 6 in the production line are placed below said transport arrangement. The surplus brine collected is led by the collecting trays 9 to a number of filter trays 10, carrying out a coarse filtering of the brine having been collected, the latter dripping from the filter trays 10 down into a fine filter 11, from which the brine can flow back to the brine tank 12, from which the pump 4 pumps brine to the multi-needle injector 1.

As it clearly appears from FIG. 1, the uppermost part of the apparatus according to the invention is provided with protective doors, partly protecting the multi-needle injector 1 from being contaminated from the surroundings, partly protecting the operating personnel from injury during the downward and upward movement of the multi-needle injector 1. The apparatus shown in the drawing is provided with wheels 14 to make it easier to move the apparatus into position above the transport arrangement 6 of the production line, and is provided with an interlock mechanism not shown for releasable connection of the apparatus with the transport arrangement 6 of the production line, so that the apparatus can easily be separated from and joined to the production line.

Figure 2:
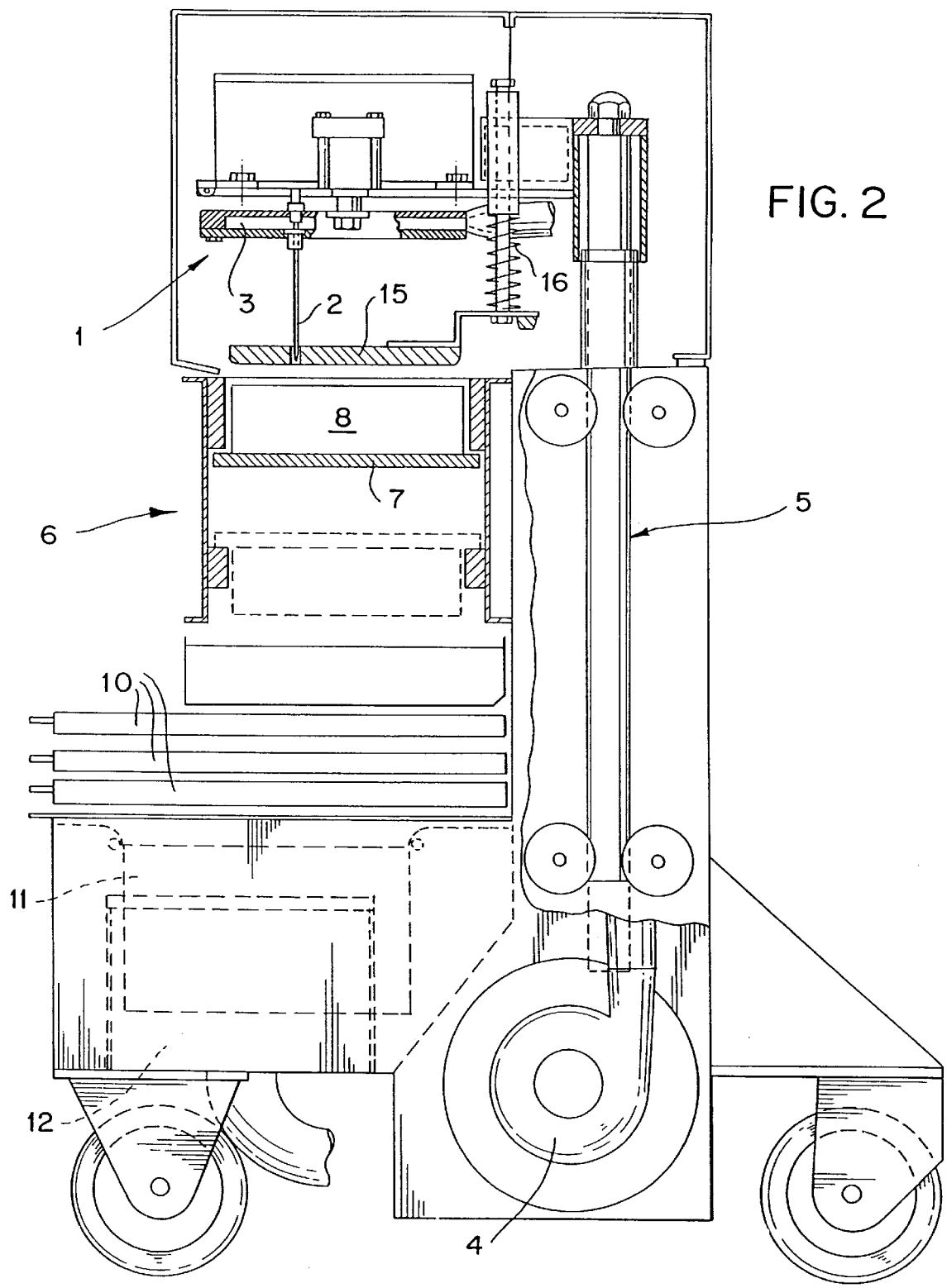
FIG. 2 is a cross-sectional view of the apparatus according to FIG. 1, placed in connection with the transport arrangement of the production line.

During the operation of the apparatus, the advancement of food products takes place with step-wise intermittent operation of the conveyor belt 7 with the vanes 8, one step corresponding to the spacing between two such vanes 8, and the intermittent operation comprises an advancement period and a period of rest, respectively. The reciprocating drive for the multi-needle injector is controlled for intermittent operation in such a manner, that—taking the topmost position of the multi-needle injector 1 shown in FIG. 2 as a starting point—the drive is started upon receipt of a synchronizing signal being produced when the intermittent advancement of the production line stops in a correct position, after which the drive carries out a complete cycle of the downward and upward movement of the multineedle injector 1, again stopping in the topmost position shown in FIG. 2. Since the cycle time for the drive is shorter than the rest period for the intermittent advancement in the production line 6, the advancement of the production line will be at rest throughout the cycle of the multi-needle injector 1. After having completed the cycle, the multi-needle injector 1 and the built-in drive await the renewed starting of the transport arrangement of the production line after the rest period and the stopping of same in the correct position, after which the synchronizing signal starts the drive again.

The embodiment of the invention as described is especially well-suited for a production line 6, in which the food product being advanced portion-wise and intermittently is poultry cut into parts, with the parts desired to be packaged in such a manner, that all parts from a completely cut-up fowl is packaged in each bag. This fowl can e.g. in a conventional manner be cut into nine parts, all of which during the operation of the apparatus are placed between two vanes 8.

In the embodiment shown, the spacing between two pusher vanes 8 is 300 mm, and the width of the conveyor belt 7 transversely of the direction of advancement is 275 mm, so that each of the corresponding upstream and downstream parts of the multi-needle injector 1 is designed to cover exactly a respective one of two such chambers between these vanes 8 following each other in succession. In the embodiment shown, the timings are such that the conveyor belt moves 300 mm corresponding to a step length in the course of approximately 1 second, and the time of rest at maximum production rate is approximately 0.7 seconds, the cycle time for the movement of the multi-needle injector correspondingly being approximately 0.7 seconds.

If the production line is to be used without brine injection, the apparatus according to the invention can merely be removed from the production line; this can also occur in connection with the cleaning of the transport arrangement of the production line and the apparatus according to the invention itself. In connection with a possible double conveyor belt it is possible to place two apparatuses as described above on each side of a double conveyor belt so as to achieve the double production capacity.

What is claimed is:

1. An apparatus for injecting brine into food products comprising:

a multiple-needle injector including a plurality of injecting needles;

a chamber supplying brine to the needles for injection through the needles into food products; and a reciprocating drive connected to the multiple-needle injector in order to move the injector downwards and upwards in accordance with synchronizing signals from a food production line that moves food products in a portion-wise and intermittent pattern, wherein the multiple needle injector covers a space in the direction of intermittent advancement of food products on the food production line corresponding to the length of at least one intermittent movement of the food product, and the reciprocating drive completes one cycle of the downward-upward movement of the injector while the food production line is not moving to inject brine into the food products.

2. The apparatus of claim 1, wherein the reciprocating drive is connected to a vertical shaft assembly, the upper part of which is connected to the multiple-needle injector.

3. The apparatus of claims 1 or 2, which further comprises releasable mechanisms for connection of the apparatus to the food production line, so that the apparatus can be retained in an operative position over the food production line during operation.

4. The apparatus of claim 3, which further comprises wheels to facilitate movement of the apparatus into and out of the operative position.

5. The apparatus of claim 1, wherein the food production line comprises a conveyer belt with vanes for advancing and separating the food products into separated spaces and wherein the multiple-needle injector is configured and dimensioned to fit between two vanes.

6. The apparatus of claim 5, wherein the multiple-needle injector is configured and dimensioned so that two groups of needles fit into two adjacent spaces separated by a vane, and the needle-insertion patterns of the two groups of needles are arranged to be mutually offset with respect to each other in order to provide a fine needle-insertion pattern in the food products.

7. The apparatus of claim 1, or 2, further comprising a collection-tray for collecting surplus brine that drips from the food production line, a filter for filtering the collected brine, and a recycle mechanism for re-using the filtered brine.

* * * * *